Figure 1:
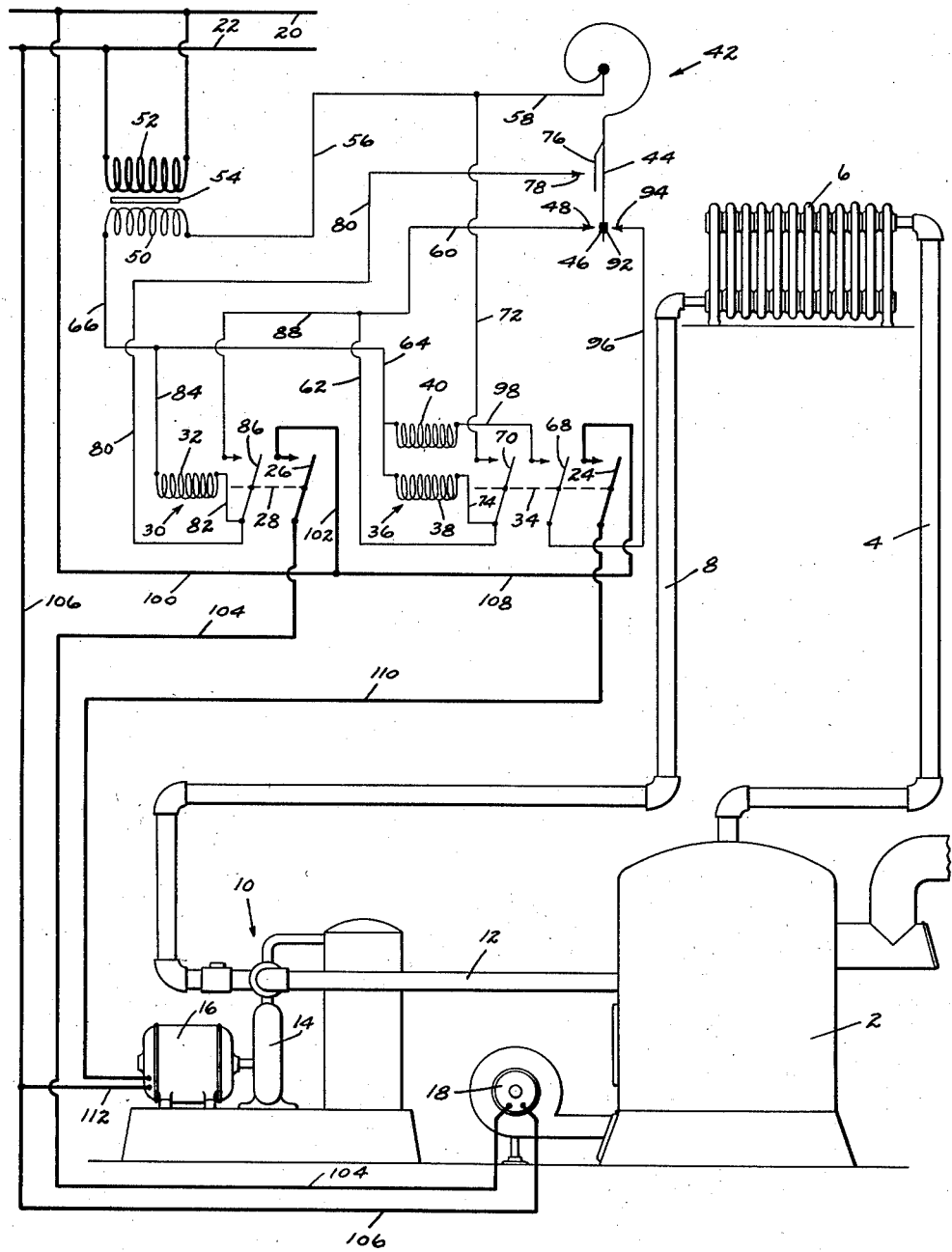

Oct. 30, 1934.  F. FILLO  1,978,705
REMOTE CONTROL FOR VACUUM HEATING SYSTEMS
Filed May 22, 1931

INVENTOR
FRANCIS FILLO
BY
ATTORNEYS

Patented Oct. 30, 1934

1,978,705

UNITED STATES PATENT OFFICE 1,978,705

REMOTE CONTROL FOR VACUUM HEATING SYSTEMS

Francis Fillo, St. Louis, Mo., assignor to Minneapolis-Honeywell Regulator Company, Minneapolis, Minn., a corporation of Delaware Application May 22, 1931, Serial No. 539,308

14 Claims. (Cl. 236—1)

This invention relates to remote controls for vacuum operated heating systems. In general, such systems include a heater for heating or generating a medium to be circulated, and any convenient type of vacuum producing means for inducing a flow of such medium through the system. In the case of a steam installation, for example, the steam is generated in a boiler and a flow is set up through a number of radiators or the like by utilizing the difference in pressure between that of the steam at the boiler and that set up by the vacuum producing means.

It is not necessary that a vacuum be maintained in systems of this character at all times for it will be obvious that if the room or other space being heated is at the desired temperature or above the desired temperature, no heating medium should flow through the radiators in a properly controlled system. The situation might even be such that it would be desirable to put the heater out of operation and in such a case the creation of a vacuum in the system would be useless. In the case of home installations, for example, in which the heater is controlled by means of a thermostat or the like, the thermostat is frequently adjusted to such a low temperature at night that the heater is scarcely in operation if at all, and the constant maintenance of a vacuum under such conditions would fail to serve any useful purpose and would merely result in a waste of energy.

It has previously been proposed to automatically maintain a vacuum by means of a control device responsive to the pressure existing in the system. When the pressure in the return to the heater rises, the vacuum producing means are automatically set in operation so as to effect the necessary reduction in pressure required for proper operation of the system when a heat exchange medium is to be circulated. Such a control device will operate to constantly maintain a predetermined vacuum in the system irrespective of whether any heat exchange medium is to be drawn through as a result of such vacuum or not.

In order to avoid the necessity for maintaining a constant vacuum irrespective of whether heating medium is to be circulated or not, it has been proposed to start and stop the vacuum producing means simultaneously with the heating means. But in such a system the response of the heating means to the room thermostat is very slow as compared to a system in which a constant vacuum is maintained. Water can be converted into steam much more rapidly when under a low pressure and for this reason steam is produced in a minimum of time in the constant vacuum system. Since it ordinarily takes an appreciable amount of time to set up a vacuum in a heating system, only a partial vacuum is set up in a system wherein the vacuum producing means are operated simultaneously with the heating means, by the time the water reaches a temperature at which it would be converted into steam if subject to the full vacuum. Heretofore it has been necessary to sacrifice quick responsiveness of the system in order to avoid constant operation of the vacuum producing means.

It is a general object of this invention to overcome the disadvantages of the prior control devices referred to above, and provide a control system wherein quick responsiveness is maintained but wherein it is not necessary to continuously operate the vacuum producing means. More particularly, the invention contemplates a system wherein the vacuum means and heat producing means are sequentially set in operation upon the occurrence of a temperature fall necessitating the circulation of additional heating medium. The sequence is such that the vacuum means are set in operation first in anticipation of a necessity for circulating heating medium.

According to the invention, in one of its simple forms, the control switch of a motor for the vacuum pump is opened and closed in response to the movements of a thermostatic central control member moving back and forth in response to temperature changes in the space being heated. A control or controls for the heater are also operated in response to the movements of the thermostatic central control member, the sequence of operation being such that the vacuum producing means will be set in operation at a temperature slightly higher than that at which the heater is controlled to heat or generate some of the heating medium for circulation. When a desired temperature is reached, the vacuum producing means are rendered inoperative and the heater is so controlled that no more heating medium is generated. Thus, the control of the system is such that the vacuum means are only in operation when needed for circulation purposes but the system responds to the room thermostat as quickly as a system in which a constant vacuum is maintained.

The various objects of the invention will be more apparent upon a reading of the accompanying drawing and specification together with the appended claims.

Fig. 1 of the drawing offers a diagrammatic showing of a simple vacuum operated heating system provided with a control in accordance with this invention.

In the drawing, the numeral 2 constitutes a heater which may be any convenient type of boiler for generating steam. The steam generated rises through pipe 4 to radiator 6 and the condensate passes through the return 8 to the vacuum producing means generally designated at 10 and thence through pipe 12 back to the boiler 2. The vacuum producing means may be of any convenient type but are shown as provided with a pump 14 operated by the electric motor 16. For purposes of illustration, the boiler 2 has been shown provided with an oil burner having an electric motor 18, the control of the boiler being effected by controlling the motor 18. It will of course be understood that any other form of control such as a damper control may be substituted.

The vacuum pump motor 16 has its terminals connected to the sides 20 and 22 of a line communicating with a source of electrical energy and the terminals of the motor 18 are also connected to the line. Upon inspection of the circuits for energizing the motors it will be observed that the circuit for motor 16 may be opened and closed by the switch 24 whereas that for motor 18 may be opened and closed by means of the switch 26. Each of the motors will therefore only operate when its control switch is closed. The burner motor control switch 26 is connected to the armature 28 of the relay generally designated at 30 and having the relay coil 32, whereas the vacuum pump motor control switch 24 is connected to the armature 34 of the relay generally designated at 36 and having relay coil 38 and neutralizing coil 40. When the relays 30 and 36 are de-energized they assume an open position in which the switches 24 and 26 are also open as shown. Upon being energized, the armatures move to the left and close the switches 24 and 26.

The central control member, which may be any temperature responsive device such as a fluid or pressure operated thermostat, is in this case a bi-metallic element generally designated at 42 which is provided with a stem 44 adapted to move back and forth with temperature fluctuations in its surrounding medium. When the temperature falls, stem 44 moves to the left and when the temperature rises it moves to the right. The stem 44 carries three contacts 46, 76 and 92 for engagement with the stationary contacts 48, 78 and 94. The arrangement is such that upon movement of stem 44 to the left of the position shown in the drawing, contacts 46 and 48 will first engage and contacts 76 and 78 will subsequently engage upon further movement to the left while contacts 46 and 48 remain in engagement. Contacts 92 and 94 will only engage upon movement to the right after the other contacts are separated.

When the temperature which it is desired to maintain exists, the bi-metallic element 42 takes the position shown in the drawing. If it be assumed that the bi-metallic element is in such position and that the relays 30 and 36 are open as shown, upon a drop in the temperature of sufficient amount to cause the contact 46 carried at the lower end of stem 44 to engage the contact 48, the following circuit for initially energizing relay 36 will be set up through the secondary 50 of the transformer having primary 52 and the usual core 54: secondary of transformer 50, wire 56, wire 58, bi-metallic element 42, contact 46, contact 48, wire 60, wire 62, wire 74, relay coil 38, wire 64, wire 66, secondary 50. When the coil 38 is energized the armature 34 will be moved to the left as previously explained and switches 24, 68 and 70 will be closed. Upon the closing of switch 70 the following holding circuit for relay 36 will be set up: secondary of transformer 50, wire 56, wire 72, switch 70, wire 74, relay coil 38, wire 64, wire 66, secondary of transformer 50. The closing of switch 24 will close the energizing circuit for the vacuum pump motor 16 and set it in operation.

Assuming a further temperature drop, the stem 44 of the thermostat will move an additional amount to the left until contact 76 which is carried by the stem 44 engages contact 78, contacts 48 and 46 remaining in engagement. When contacts 78 and 76 engage the following circuit for initially energizing the coil 32 of relay 30 will be set up: secondary of transformer 50, wire 56, wire 58, bi-metallic element 42, contact 76, contact 78, wire 80, wire 82, relay coil 32, wire 84, wire 66, secondary 50. When coil 32 is energized the armature 28 will move to the left thereby closing switches 26 and 86. The closure of switch 26 will result in the closing of the circuit for energizing the burner motor 18 thereby to set it in operation, and closure of switch 86 will set up the following holding circuit for relay 30: secondary of transformer 50, wire 56, wire 72, switch 70, wire 62, wire 88, switch 86, wire 82, relay coil 32, wire 84, wire 66, secondary 50. This holding circuit is independent of contact pairs 78 and 76, and 48 and 46.

If the temperature rises a sufficient amount to cause the thermostat to move to the right and again assume the position shown in the drawing wherein the contacts 78 and 76, and 48 and 46 are separated, the relay coils 32 and 38 will nevertheless remain energized through their respective holding circuits and switches 24 and 26 will remain closed. If the temperature continues to rise, however, until the stem 44 moves to the right a sufficient amount to cause contact 92 carried by the stem to engage contact 94, the following circuit will be set up to energize the neutralizing coil 40: secondary of transformer 50, wire 56, wire 58, bi-metallic element 42, contact 92, contact 94, wire 96, switch 68, wire 98, neutralizing coil 40, wire 64, wire 66, secondary 50. As soon as coil 40 is energized it will neutralize the flux of coil 38 with the result that armature 34 will move to the right thereby to open switches 24, 68 and 70. The opening of switch 70 breaks the holding circuits for both relays so that armature 28 of relay 30 will also move to the right thereby to open switches 86 and 26. The opening of switches 24 and 26 will of course break the energizing circuits of the motors 16 and 18 respectively, the energizing circuit for motor 18 comprising side of line 20, wire 100, wire 102, switch 26, wire 104, motor 18, wire 106, and side of line 22, and the energizing circuit for the motor 16 comprising side of line 20, wire 100, wire 108, switch 24, wire 110, motor 16, wire 112, wire 106 and side of line 22. Opening of switch 68 breaks the circuit through neutralizing coil 40. The armatures 28 and 34 of the relays 30 and 36 preferably move to the right under the influence of gravity when the relays are de-energized.

It will be observed that relays 30 and 36 will not again be energized until the stem 44 of the thermostat moves to the left under the influence of a temperature fall. If relays 30 and 36 are both de-energized and open, and the stem 44 of the thermostat is in the position shown in the drawing, the vacuum pump motor 16 will be set in operation when the temperature drops sufficiently to move the stem 44 and its contact 46 into engagement with contact 48. Upon a further temperature fall the burner motor 18 will be set in operation after engagement of contacts 76 and 78, the motor 16 meanwhile remaining in operation. Both motors continue to operate until the temperature of the medium surrounding the thermostat reaches a high point at which contacts 92 and 94 engage and both motors are rendered inoperative.

It will be noted that burner motor 18 is never energized until the vacuum pump motor 16 has been energized so that means will always be present to circulate the medium generated or heated in the boiler 2. Moreover the vacuum pump motor is idle when the boiler 2 is not generating or about to generate heating medium for circulation through the system. It is only in operation when actually needed in the system. Obviously, the same principle may be applied to other temperature regulating plants such as cooling plants in which flow of the cooling medium is effected by means of a vacuum.

I claim as my invention:

1. The combination with a heating plant having vacuum producing means and at least a pair of heat delivery controls of which one operates the vacuum producting means, of temperature responsive means for first operating the control for the vacuum means and then operating the other heat delivery control during the course of temperature fall.

2. The combination with a heating plant having vacuum producing means and at least a pair of heat delivery controls of which one operates the vacuum producing means, of a central control member moving along a predetermined path of travel, and means associated with the central control member for successively operating the control for the vacuum producing means and operating the other heat delivery control in the course of movement along its path of travel.

3. The combination with a heating plant having vacuum producing means and at least a pair of heat delivery controls of which one operates the vacuum producing means, of a temperature responsive central control member moving along a predetermined path of travel, and means associated with the central control member for successively operating the control for the vacuum producing means and operating the other heat deliver control in the course of movement along its path of travel.

4. The combination with a heating plant having vacuum producing means and at least a pair of heat delivery controls of which one operates the vacuum producing means, of a temperature responsive central control member moving along a predetermined path of travel in response to temperature changes in its surrounding medium, and means associated with the central control member for first operating the control for the vacuum means and then operating the other heat delivery control in the course of movement along its path of travel during a temperature fall.

5. The combination with a heating plant having vacuum producing means and at least a pair of heat delivery controls of which one operates the vacuum producing means, of a temperature responsive central control member moving along a predetermined path of travel in response to temperature changes in its surrounding medium, means associated with the central control member for first operating the control for the vacuum means and then operating the other heat delivery control in the course of movement along its path of travel during a temperature fall, and means associated with the central control member for subsequently again operating both controls in the course of movement of the control member in response to a temperature rise.

6. The combination with a heating plant having a vacuum producing means and at least a pair of heat delivery controls of which one operates the vacuum producing means, of a temperature responsive central control member moving along a predetermined path of travel in response to temperature changes in its surrounding medium, means associated with the central control member for first operating the control for the vacuum means and then operating the other heat delivery control in the course of movement along its path of travel during a temperature fall, and means associated with the central control member for subsequently again operating both controls simultaneously in the course of movement of the control member in response to a temperature rise.

7. The combination with a heating system having a heater for a circulating medium, and means for producing a vacuum thereby to draw the circulating medium through said system, of temperature responsive means for setting said vacuum producing means in operation at a predetermined temperature during temperature fall, and temperature responsive means for subsequently controlling the heater upon a further temperature fall.

8. The combination with a heating system having a heater for a circulating medium, and electrically operated means for producing a vacuum in said system thereby to draw the heating medium therethrough, of a circuit for energizing said vacuum producing means, a control switch in said circuit for opening and closing the same, means for closing said switch at a predetermined temperature, and means for controlling said heater at a lower temperature.

9. The combination with a heating system having a heater for a circulating medium, and electrically operated means for producing a vacuum in said system thereby to draw the heating medium therethrough, of a circuit for energizing said vacuum producing means, a control switch in said circuit for opening and closing the same, means for closing said switch at a predetermined temperature, means for controlling said heater at a lower temperature, and means for opening said switch and further controlling said heater at a higher temperature.

10. The combination with a heating system having a heater, vacuum producing means, and a control for the heater, of a control switch for rendering said vacuum producing means operative and inoperative upon being closed and opened, a central control member adapted to move in a predetermined path of travel in response to changes in temperature in its surrounding medium, means associated with the central control member for closing said switch upon reaching a predetermined point in its travel during a temperature fall, and additional means associated with the central control member for subsequently operating said heater control upon reaching a second point in its path of travel as the result of a further temperature fall.

11. The combination with a heating system having a heater, vacuum producing means, and a control for the heater, of a control switch for rendering said vacuum producing means operative and inoperative upon being closed and opened, a central control member adapted to move in a predetermined path of travel in response to changes in temperature in its surrounding medium, means associated with the control member for closing said switch upon reaching a predetermined point in its travel during a temperature fall, further means associated with the central control member for subsequently operating said heater control upon reaching a second point in its path of travel as the result of a further temperature fall, and additional means associated with the central control member for opening said vacuum control switch and further operating said heater control upon reverse movement of the central control member during temperature rise.

12. The combination with a heating system having a heater, vacuum producing means, and a control for the heater, of a control switch for rendering said vacuum producing means operative and inoperative when closed and opened, a relay for opening and closing said vacuum control switch, a central control member moving back and forth along a predetermined path of travel in response to changes in the temperature of its surrounding medium, means associated with the central control member for energizing said relay upon reaching a predetermined point in its travel during a temperature fall, and additional means associated with the central control member for subsequently operating said heater control upon reaching a second point in its travel upon further temperature fall.

13. The combination with a heating system having a heater, vacuum producing means and a switch for controlling the heater, of a control switch for rendering said vacuum producing means operative and inoperative when closed and opened, a first relay for opening and closing the vacuum control switch, a second relay for opening and closing the heater control switch, each of said relays being adapted when de-energized to assume an open position in which their respective switches are open, a central control member adapted to move back and forth along a predetermined path of travel in response to changes in the temperature of its surrounding medium, means associated with the central control member for energizing said first relay upon reaching a predetermined point in its travel during a temperature fall, additional means associated with the central control member for subsequently energizing said second relay upon reaching a second point in its travel as a result of further temperature fall, and further means associated with the central control member for de-energizing each of said relays after reversing its travel due to a temperature rise.

14. The combination with a heating system having a heater, a motor operated burner for said heater, a vacuum pump, and a motor for operating said pump, of a circuit for energizing said pump motor, a pump motor control switch in said circuit, a circuit for energizing said burner motor, a burner motor control switch in said circuit, a first relay for actuating said pump motor control switch, a second relay for actuating said burner motor control switch, a central control member adapted to move back and forth along a predetermined path of travel in response to changes in temperature in its surrounding medium, means associated with the central control member for energizing said first relay upon reaching a predetermined point in its path of travel during temperature fall, further means for energizing said second relay when said central control member reaches a second point in its path of travel upon further temperature fall, and additional means associated with the control member for subsequently de-energizing both of said relays during reverse movement in its path of travel under the influence of a rise in the temperature of its surrounding medium.

FRANCIS FILLO.